United States Patent [19]

Büthe et al.

[11] 4,421,872

[45] Dec. 20, 1983

[54] PROCESS FOR THE PREPARATION OF ELASTIC FLEXIBLE POLYURETHANE FOAMS

[75] Inventors: Ingolf Büethe, Boehl-Iggelheim; Wolfgang Straehle, Heidelberg; Matthias Marx, Bad Durkheim; Reinhard Peters, Munich, all of Fed. Rep. of Germany

[73] Assignee: BASF Aktiengesellschaft, Ludwigshafen, Fed. Rep. of Germany

[21] Appl. No.: 414,572

[22] Filed: Sep. 2, 1982

[30] Foreign Application Priority Data

Sep. 18, 1981 [DE] Fed. Rep. of Germany ....... 3137132

[51] Int. Cl.³ ...................... C08G 18/00; C08G 18/14
[52] U.S. Cl. .................................................. 521/174
[58] Field of Search ........................................ 521/174

[56] References Cited

U.S. PATENT DOCUMENTS

| | | | |
|---|---|---|---|
| 4,067,832 | 1/1978 | Des Marais | 521/174 X |
| 4,125,505 | 11/1978 | Crutchfield et al. | 524/377 |
| 4,144,386 | 3/1979 | Consoli et al. | 521/174 X |
| 4,243,760 | 1/1981 | McDonald et al. | 521/176 |
| 4,303,755 | 12/1981 | Yukuta et al. | 521/174 X |
| 4,327,194 | 4/1982 | Chandalia et al. | 521/174 X |
| 4,373,034 | 2/1983 | Speranza et al. | 521/174 X |
| 4,374,934 | 2/1983 | Raynor | 521/174 X |

FOREIGN PATENT DOCUMENTS

| | | |
|---|---|---|
| 1413774 | 8/1965 | France . |
| 1089140 | 11/1967 | United Kingdom . |
| 1460863 | 1/1977 | United Kingdom . |

*Primary Examiner*—Lucille M. Phynes
*Attorney, Agent, or Firm*—Joseph D. Michaels

[57] ABSTRACT

For the preparation of elastic flexible polyurethane foams with improved breaking elongation and very good setting behavior as well as densities from 7 to 120 grams per liter, organic polyisocyanates are reacted in the presence of blowing agents, catalysts and, optionally, auxiliaries and/or additives with polyols based on polyoxyalkylene polyols having terminal oxyethylene blocks of a degree of oxyethlation of 1 to 13 and which have a content of primary hydroxyl groups at the corresponding degree of oxyethylation equal or exceeding the value of curve A in the Figure in which curve A describing the relationship of the content of primary hydroxyl groups with the degree of oxyethylation.

8 Claims, 1 Drawing Figure

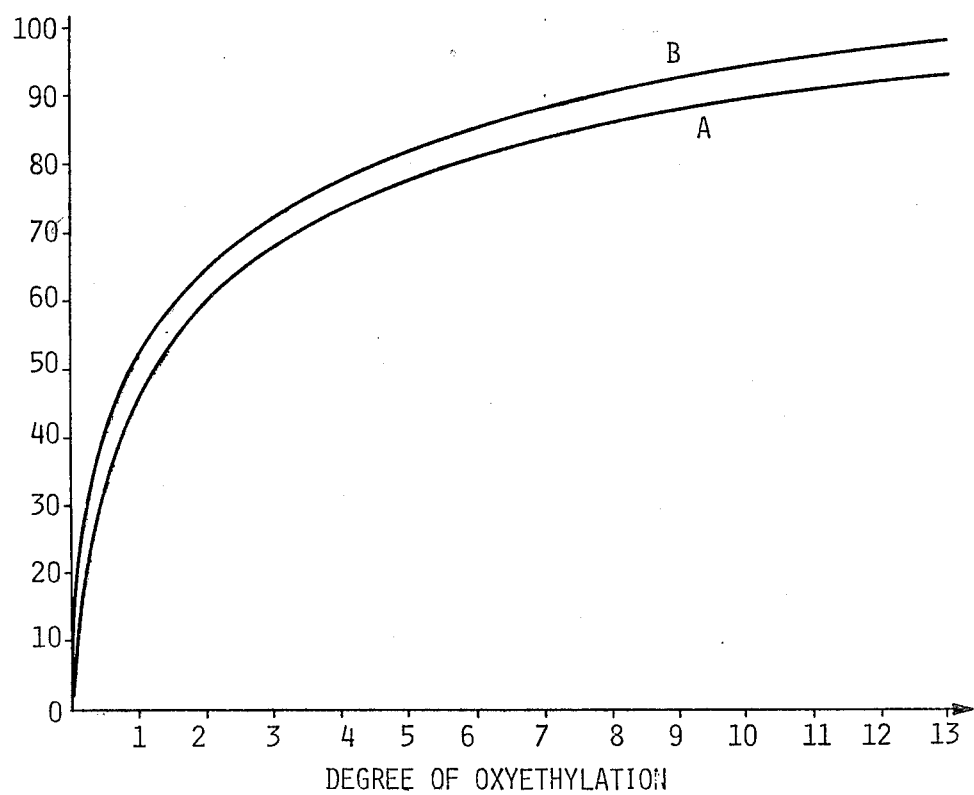

PROCESS FOR THE PREPARATION OF ELASTIC FLEXIBLE POLYURETHANE FOAMS

BACKGROUND OF THE INVENTION

1. Field of the Invention

This patent relates to the field of elastic, flexible, cellular polyurethane polymers. More specifically it relates to improved physical properties of the foams achieved by the use of polyoxyalkylene polyols having terminal oxyethylene blocks and a specified degree of oxyethylation coupled with a minimum limit of primary hydroxyl groups.

2. Description of the Prior Art

The preparation of flexible cellular polyurethane (PUR) polymers by reacting polyisocyanates with polyols and, optionally, chain extenders or cross-linking agents in the presence of blowing agents and catalysts as well as, optionally, auxiliaries and additives is known from numerous patents and literature citations. We should like to refer, for example, to the monographs by J. H. Saunders and K. C. Frisch, "High Polymers Series—vol. XVI," *Polyurethanes,* parts I and II (Interscience Publishers, New York, 1962 and 1964) and R. Vieweg and A. Hoechtlen, "Plastics Handbook—vol. VII," *Polyurethanes,* (Carl Hanser Publishers, Munich, 1966).

In all areas of application, flexible polyurethane foams must have a high level of mechanical properties manifested in high breaking elongation, tensile strength, and Grave's tear strength such that they may be used at as low a density as possible and still provide suitable performance.

Optimum utilization of production facilities is facilitated by short setting times of the foams.

It is also known that change in process measures can influence the mechanical properties. The break elongation, for example, can be improved by decreasing the hydroxyl/isocyanate group ratio (index). However, this measure simultaneously lowers the compression hardness ("Plastics Handbook—vol. VII," *Polyurethanes,* pages 478–486). Such contrary property shifts which are frequently incurred by practice of the prior art are undesirable.

SUMMARY OF THE INVENTION

The purpose of this invention was to improve the breaking elongation in flexible PUR foams with good mechanical properties without negatively influencing the other mechanical properties. Furthermore, the setting time of the foams was to be shortened thereby increasing production capacity.

These requirements could be met by using polyether polyols with a high content of primary hydroxyl groups with a comparatively low portion of polymerized ethylene oxide as terminal oxyethylene blocks for the preparation of flexible foams.

Thus, the subject of this invention is a process for the preparation of elastic PUR flexible foams by reacting organic polyisocyanates with block polyether polyols in the presence of blowing agents, catalysts and, optionally, chain extenders or cross-linking agents, auxiliaries and/or additives wherein the blocked polyether polyols are polyoxyethylene-capped polyether polyols with an oxyethylation degree of 1 to 13 and a content of primary hydroxyl groups equal or exceeding the value of curve A at the corresponding degree of oxyethylation.

In addition to increasing the breaking elongation and shortening the setting time, this invention also, advantageously, reduces the shrinking tendency of PUR flexible foams by making the foams more open celled.

BRIEF DESCRIPTION OF THE DRAWINGS

In the FIGURE, curve A describes the dependency of the content of primary hydroxyl groups on the degree of oxyethylation. Curve B describes a preferred level of primary hydroxyl contents.

DESCRIPTION OF THE PREFERRED EMBODIMENTS

The known organic polyisocyanates are suitable for the preparation of flexible PUR foams in accordance with the process of this invention. Examples include aliphatic, cycloaliphatic, arylaliphatic and preferable aromatic multifunctional isocyanates. Specific examples include: aliphatic diisocyanates such as ethylene diisocyanate, 1,4-butane diisocyanate, 1,6-hexane diisocyanate and 1,12-dodecane diisocyanate; cycloaliphatic diisocyanates such as 1,3- and 1,4-cyclohexane diisocyanate, as well as any desired mixtures of these isomers, 5-isocyanatomethyl-3,3,5-trimethylcyclohexane isocyanate, 2,4- and 2,6-hexahydrotoluene diisocyanate, as well as any desired mixtures of these isomers, 4,4'- and 2,4'-dicyclohexylmethane diisocyanate; aromatic diisocyanates such as 1,3- and 1,4-phenylene diisocyanate, 2,4- and 2,6-toluene diisocyanate, as well as desired mixtures of these isomers, 2,2'-, 2,4'- and 4,4'-diphenylmethane diisocyanate, and 1,5-naphthalene diisocyanate; aromatic polyisocyanates such as 4,4',4"-triphenylmethane triisocyanate, 2,4,6-benzene triisocyanate and polyphenyl polymethylene polyisocyanates. Modified polyisocyanates may also be used. Examples thereof include those described in U.S. Pat. No. 3,492,330, carbodiimide group-containing polyisocyanates (German Pat. No. 10 92 007), allophanate group-containing polyisocyanates (British Pat. No. 994,890; Belgium Pat. No. 761,626), isocyanurate group-containing polyisocyanates (German Pat. Nos. 10 22 789, 12 22 067, 10 27 394, German Published Applications Nos. 19 29 034 and 20 04 048), urethane group-containing polyisocyanates (Belgium Pat. No. 752,261, U.S. Pat. No. 3,394,164), biuret group-containing polyisocyanates (German Pat. No. 11 01 394, British Pat. No. 889,050) and ester group containing polyisocyanates (British Pat. Nos. 965,474, 1,072,956, U.S. Pat. No. 3,567,763, German Pat. No. 12 31 688).

Preferably used are the easily accessible, optionally urethane group-containing, aromatic di- and polyisocyanates such as 2,4- and 2,6-toluene diisocyanate, as well as any desired mixtures of these isomers, 2,2'-, 2,4'- and 4,4'-diphenylmethane diisocyanate, as well as any desired mixtures of these isomers, mixtures of 2,2'-, 2,4'-, 4,4'-diphenylmethane diisocyanate and polyphenyl polymethylene polyisocyanates (crude MDI) and mixtures of toluene diisocyanates and crude MDI. The referenced di- and polyisocyanates may be used individually or in the form of mixtures.

A significant characteristic of this invention is the use of highly activated polyoxyalkylene polyols with terminal oxyethylene blocks as polyether polyols. Suitable for this purpose are polyoxyethylene-capped polyoxyalkylene polyols with oxyethylation degrees of 1 to 13, preferably 2 to 8, and a content of primary hydroxyl groups equal to or exceeding a value dependent on the oxyethylation degree as shown by curve A, preferably of the value of curve B, in the FIGURE. Curves A and B describe the dependency of the content of primary hydroxyl groups upon the ethoxylation degree. The oxyethylation degree is herein defined as the quotient of the total number of oxyethylene units in the terminal oxyethylene blocks and the functionality of the polyoxyalkylene polyol. In detail, the polyoxyethylene-capped polyether polyols usable in accordance with this invention have the following primary hydroxyl group content depending upon the degree of oxyethylation:

TABLE

| Degree of Oxyethylation | Minimum Primary Hydroxyl Group Content, % of Total Hydroxy Groups | |
|---|---|---|
| | A | B* |
| 1 | 46.0 | 52 |
| 1.5 | 54.3 | 59.5 |
| 2 | 59.7 | 65.0 |
| 2.5 | 63.9 | 69.0 |
| 3 | 67.3 | 72.5 |
| 3.5 | 70.2 | 75.5 |
| 4 | 72.7 | 78 |
| 4.5 | 74.9 | 80 |
| 5 | 76.8 | 82 |
| 5.5 | 78.8 | 84 |
| 6 | 80.2 | 85.5 |
| 7 | 83.1 | 88.2 |
| 8 | 85.6 | 90.7 |
| 9 | 87.8 | 93 |
| 10 | 89.8 | 95 |
| 11 | 91.0 | 96 |
| 12 | 92.0 | 97 |
| 13 | 93.0 | 98 |

*Preferred minimum value

The limit values of A and B listed in the Table are located on Curves A and B in the FIGURE.

The preparations of the polyoxyalkylene polyols to be used in accordance with this invention are described in German Patent Application No. P 30 30 737.0 and are carried out stepwise in several stages.

In the first stage, the initiator polyol is reacted with 0.01 mole to 0.25 mole, of a basic catalyst per equivalent Zerewitinoff active hydrogen atom of the initiator and unwanted water or other volatile products from the catalyst addition or reaction are removed by distillation at reduced pressure. In the second stage, substituted or unsubstituted alkylene oxides having three or more carbon atoms or mixtures of such substituted or unsubstituted alkylene oxides and ethylene oxide are reacted with the initiator-catalyst mixture by the gradual addition of the alkylene oxides. Dependent on the nature of the initiator and the level of catalyst, the initial solubility of the alkalene oxides in the reaction medium may be limited. However, as polymerization progresses with the resultant increase of the molecular weight of the polymer, the solubility of the alkylene oxides with the reaction medium increases. In the third reaction stage which occurs after reaction of approximately 20 percent of the intended charge of substituted or unsubstituted alkylene oxides optionally mixed with ethylene oxide, the catalyst amount can be increased stepwise or in one step so that 0.10 to 1.0 mole, preferably 0.12 to 0.3 mole, of basic catalyst is present in the reaction mixture per equivalent Zerewitinoff active hydrogen atom of the initiator molecule. If the catalyst amount is increased stepwise, before each catalyst addition, the oxide addition is stopped and the polymerization is continued until reaction of the contained oxide is completed. However, it is also possible to polymerize to a 100 percent conversion of contained oxide and to then increase the amount of catalyst in one step. For products with hydroxyl numbers of 25 or higher, it has proven to be advantageous to use a total of 0.1 to 1 mole of basic catalyst and for products with hydroxyl numbers less than 25, 0.12 to 1.0 mole of basic catalyst per equivalent Zerewitinoff active hydrogen atom of the initiator molecule is used advantageously.

If an increase in the primary hydroxyl groups by less than approximately 12 percent is desired, it has proven to be advantageous to not increase the catalyst concentration as polymerization progresses but to use 0.10 to 0.25 moles, particularly 0.12 to 0.18 moles of basic catalyst per equivalent Zerewitinoff active hydrogen atom of the initiator molecule at the beginning of the polymerization.

In a final stage of oxyalkylation, the crude polyether polyol is reacted in the presence of the introduced catalyst amount of 0.10 to 1.0 mole of basic catalyst per reactive hydrogen atom with a maximum of 30 percent by weight, preferably 5 to 20 percent by weight, and particularly 10 to 18 percent by weight of ethylene oxide based on the weight of the crude polyether polyol. The degree of oxyethylation is dependent upon the equivalent weight of the polyether polyol, for instance, with an equivalent weight of 500, 8.8 to 30 percent by weight of ethylene oxide result in oxyethylation degrees of 1 to 3.5. With an equivalent weight of 1000, 4.4 to 30 percent by weight of ethylene oxide result in an oxyethylation degree of 1 to 6.8 and with an equivalent weight of 2000, 2.2 to 30 percent by weight of ethylene oxide will result in an oxyethylation degree of 1 to 13.6.

In detail, the polyoxyalkylene polyols are advantageously prepared as follows:

The hydroxyl group containing initiator molecules are transformed partially into the corresponding alcoholates with 0.01 to 0.25 moles of at least one basic catalyst per equivalent hydroxyl group. If amino group-containing compounds are used, at least one mole of alkylene oxide is initially added to each equivalent reactive hydrogen without the use of catalyst, and the resultant addition product is used as initiator molecule. Depending upon the catalyst used, possibly formed water or low boiling alcohol is then removed by distillation, advantageously under reduced pressure. At temperatures of 50° C. to 150° C., preferably of 80° C. to 130° C., the substituted or unsubstituted alkylene oxides having three or more carbon atoms or mixtures of such alkylene oxides and ethylene oxide in a weight ratio of 100:0 to 60:40, preferably of 99.5:0.5 to 80:20 which are optionally diluted with a gas such as nitrogen which is inert under the reaction conditions are introduced into the reaction mixture at the rate at which they react, for instance, in 4 to 30 hours, preferably 6 to 10 hours, under atmospheric pressure or optionally under increased pressure at 1.1 to 20 bars, preferably 1.1 to 7 bars.

After approximately 20 percent has been added, the addition may optionally be interrupted in order to increase the catalyst concentration. However, in order to facilitate this process, the unreacted possibly ethylene oxide-containing substituted or unsubstituted alkylene oxides must be separated, preferably under reduced pressure. Water or low boiling alcohol formed after the addition of the catalyst must be removed by distillation before the polymerization can be resumed. If the amount of catalyst is increased in stages, the above-described processes must be repeated several times, for instance, 2 to 10 times. It has proven to be advantageous for economic reasons and thus applied in a preferred process to complete the polymerization, that is, to continue the polymerization after oxide addition is halted until an approximately 100 percent reaction of contained monomeric oxide has been achieved before the catalyst concentration is increased.

Using this preferred process variation, after completing the polymerization, the residual substituted or unsubstituted alkylene oxide which possibly contains ethylene oxide is removed by distillation at temperatures of 100° C. to 150° C. under reduced pressure. The amount of catalyst is increased in one step to transform the resultant crude polyether polyol partially or completely into the alcoholate which is reacted ("capped") under the above-mentioned reaction conditions with a maximum of 30 percent by weight of ethylene oxide based on the polyether polyol mixture.

After removing the residual unreacted ethylene oxide by distillation, the alkali-containing polyoxyalkylene polyols thus prepared are neutralized with inorganic acids such as sulfuric acid, hydrochloric acid or phosphoric acid, acid reacting salts such as potassium hydrogen phosphate, organic acids such as citric acid, tartaric acid, among others, or ion exchange resins and are purified in accordance with known methods.

Suitable substituted or unsubstituted alkylene oxides with 2 to 4 carbons in the alkylene chain and molecular weights of 44 to 120, preferably 44 to 72, include 1,2- and 2,3-butylene oxide, styrene oxides, optionally substituted at the phenyl group, cyclohexene oxide and preferably propylene oxide. While the aforementioned class of compounds also includes ethylene oxide, in this disclosure it is always indicated separately. For the preparation of the crude polyether polyols suitable for "capping," the substituted or unsubstituted alkylene oxides may be used individually, alternatingly in sequence, as mixtures or as ethylene oxide-containing mixtures.

Suitable initiator molecules are di- to tetrafunctional polyamines and polyols and, preferably, di- to trifunctional polyols. Specific examples include:

Ammonium, hydrazine, aliphatic and aromatic, optionally N-mono- and N,N'-dialkyl substituted diamines with 1 to 4 carbon atoms in the alkyl radical such as substituted or unsubstituted mono- and dialkyl substituted ethylenediamine, diethylenetriamine, triethylenetetramine, 1,3-propanediamine, 1,3- or 1,4-butanediamine, 1,2-, 1,3-, 1,4-, 1,5- and 1,6-hexanediamine, phenylenediamines, 2,3-, 2,4- and 2,6-toluenediamine and 4,4'-, 2,4'- and 2,2'-diaminodiphenylmethane; alkanolamines such as ethanolamine, diethanolamine, N-methyl- and N-ethyldiethanolamine, and triethanolamine as well as water. Preferably used are multifunctional alcohols such as ethylene glycol, propylene glycol, trimethylene glycol, diethylene glycol, dipropylene glycol, 1,4-butanediol, 1,6-hexamethylene glycol, glycerin, trimethylol propane and pentaerythritol. Di- and trifunctional alcohols are particularly preferred.

Commonly used catalysts are alkali alkoxide with 1 to 4 carbon atoms in the alkyl radical such as sodium methylate, sodium and potassium ethylate, sodium isopropylate and sodium butylate; alkaline earth hydroxides such as calcium hydroxide; and, preferably, alkali hydroxides such as lithium, cesium and, particularly, potassium and sodium hydroxides.

The polyoxyethylene-capped polyols to be used in accordance with this invention are di- to tetrafunctional, preferably di- to trifunctional and have hydroxyl numbers from 10 to 250, preferably 10 to 75, and particularly of 20 to 56. The products are extraordinarily reactive in the reaction with organic polyisocyanates and their urethane, carbodiimide, isocyanurate or urea group modified derivatives. Products with a low content of oxyethylene units also excel by an improved miscibility with aromatic polyisocyanates.

The polyoxyethylene-capped polyols to be used in accordance with this invention may be applied individually or in the form of mixtures. Mixtures of polyoxyethylene-capped polyether polyols with other available polyether polyols have also proven to work well if the mixtures contain at least 40 percent by weight, preferably 60 to approximately 100 percent by weight, of polyoxyethylene-capped polyether polyol based on the total weight. In the sense of this invention, other available polyether polyols are understood to include graft polymer polyether polyols or filler-polyether polyol dispersions.

It may also be advantageous to use chain extenders or cross-linking agents in addition to the mentioned capped polyether polyols and the optionally mentioned other available polyether polyols in order to introduce rigid segments in the flexible PUR foam. Examples for such substances include polyfunctional, particularly di- and trifunctional compounds with molecular weights of 17 to 600, preferably 60 to 300. Examples for compounds used are di- and trialkanolamines such as diethanolamine and triethanolamine, aliphatic and aromatic diamines such as ethylenediamine, 1,4-butanediamine, 1,6-hexanediamine, 4,4'-diaminodiphenylmethane, 3,3'-dialkyl substituted, 4,4'-diaminodiphenylmethanes, 2,4- and 2,6-toluenediamine and preferably aliphatic diols and triols with 2 to 6 carbon atoms such as ethylene glycol, 1,4-butane diol, 1,6-hexamethylene glycol, glycerin and trimethylolpropane. If chain extenders or cross-linking agents are used, they are applied in quantities of 1 to 10, preferably of 1 to 4 parts by weight per 100 parts by weight of polyol used.

Blowing agents which may be used in accordance with the process of this invention preferably include water which reacts with isocyanate groups to form carbon dioxide. The amounts of water which are used advantageously are 0.5 to 20 parts by weight, preferably 1.5 to 10 parts by weight and particularly 2 to 6 parts by weight based on 100 parts by weight of polyols used.

Physical blowing agents may also be used as mixtures with water. Suitable for this application are liquids which are inert with respect to the organic polyisocyanates and have boiling points below 100° C., preferably below 50° C., particularly between −50° C. and 30° C. under atomspheric pressure so that they evaporate under the influence of the exothermic polymerization reaction. Examples for such preferably applicable liquids are hydrocarbons such as pentane, n- and isobutane and propane, ethers such as dimethyl ether and diethyl ether, ketones such as acetone and methyl ethyl ketone, ethyl acetate and, preferably, halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low boiling liquids with each other and/or with other substituted or unsubstituted hydrocarbons may also be used.

The amount of physical blowing agents required in addition to water can be determined in a simple fashion as a function of the desired foam density and is approximately 0 to 40 parts by weight, preferably 0 to 20 parts by weight, per 100 parts by weight of polyol used. It may be appropriate to mix the organic polyisocyanate with the physical blowing agent thereby reducing its viscosity.

In order to accelerate the reaction between the organic polyisocyanate and the polyoxyalkylene polyols, water and, optionally, chain extenders or cross-linking agents, commonly used polyurethane catalysts are incorporated in the reaction mixture. Preferably used polyurethane catalysts are, for example, tertiary amines such as dimethylbenzylamine, dicyclohexylmethylamine, dimethylcyclohexylamine, N,N,N',N'-tetramethyldiaminoethylether, bis(dimethylaminopropyl)urea, N-methyl- and/or N-ethylmorpholin, dimethylpiperazine, pyridine, 1,2-dimethylimidazole, 1-azobicyclo(3,3,0)octane, dimethylaminoethanol, N,N',N"-tris(-dialkylaminoalkyl)hexahydrotriazine such as N,N',N"-tris(dimethylaminopropyl)-s-hexahydrotriazine and particularly triethylenediamine. However, also suitable are metal salts such as iron-(II)-chloride, zinc chloride, lead octoate and preferably tin salts such as tin dioctoate, tin diethylhexoate and dibutyltin dilaurate as well as particularly mixtures of tertiary amines and organic tin salts. Advantageously used are amounts of 0.1 to 10 percent by weight, preferably 0.5 to 5 percent by weight of catalyst based on tertiary amines and/or 0.01 to 0.5 percent by weight, preferably 0.05 to 0.25 percent by weight of metal salts based on the weight of the polyols used.

Auxiliaries and additives may also be added to the reaction mixture. Examples include surfactants, foam stabilizers, cell regulators, fillers, dyes, pigments, flame retardants, hydrolysis protection agents, fungistats and bacteriostats.

Possible surfactants include compounds which support the homogenization of the starting materials and which may also be suited for regulating the cell structure. Examples include emulsifiers such as the sodium salts of sulfated castor oil or of fatty acids as well as salts of fatty acids with amines such as diethylammonium oleate or diethanolammonium stearate, salts of sulfonic acids such as alkali or ammonium salts of dodecylbenzene- or dinaphthylmethane disulfonic acid; foam stabilizers such as siloxane-oxyalkylene block polymers and other organo polysiloxanes, oxyethylated alkylphenols, oxyethylated fatty alcohols, paraffin oils, esters of castor oil and/or ricinoleic acid and Turkish red oil and cell regulators such as paraffins, fatty alcohols and dimethylpolysiloxanes. The surfactants are usually applied in amounts of 0.01 part to 5 parts by weight based on 100 parts by weight of polyol used.

Fillers, particularly fillers with a reinforcing effect, are understood to be the well known, commonly used organic and inorganic fillers, reinforcing agents, loading agents, agents for improving the abrasion behavior in paints and coatings, etc. Examples in detail include: inorganic fillers such as silicate minerals including layer silicates such as antigorite, serpentine, hornblende, amphiboles, chrisotile, talcum; metal oxides such as kaolin, aluminum oxide, titanium oxide and iron oxide, metal salts such as lime, heavy spar and inorganic pigments such as cadmium sulfide, zinc sulfide, as well as glass, asbestos meal and others. Preferably used are kaolin (China Clay), aluminum silicate and coprecipitates of barium sulfate and aluminum silicate as well as natural and synthetic fibrous minerals such as asbestos, wollastonite and, particularly, glass fibers of various lengths which may be sized. Examples of organic fillers include coal, melamine, collophonium, cyclopentadienyl resins and, preferably, graft polymers based on styrene-acrylonitrile which are produced by in situ polymerization of acrylonitrile-styrene mixtures in polyether polyols analogous with the data in German Pat. Nos. 11 11 394, 12 22 669 (U.S. Pat. Nos. 3,304,273, 3,383,351, 3,523,093), 11 52 536 (British Pat. No. 1,040,452), and 11 52 537 (British Pat. No. 987,618) and filler-polyols where aqueous polymer dispersions are transformed into polyol dispersions.

The inorganic and organic fillers may be used individually or as mixtures. Preferably used are stable filler-polyether polyol dispersions for which the size of the fillers is reduced to a particle size of less than 7 microns in situ with high local energy densities in the presence of polyether polyols and are simultaneously dispersed. Filler-polyether polyol dispersions of this type are described, for example, in German Published Applications Nos. 28 50 609, 28 50 610 and 29 32 304.

The inorganic and organic fillers are preferably incorporated in the reaction mixture in amounts of 0.5 to 50 percent by weight, preferably 1 to 40 percent by weight, based on the weight of the polyisocyanate and polyoxyalkylene polyol mixture.

Suitable flame retardants include tricresylphosphate, tris-2-chlorethylphosphate, tris-chloropropylphosphate and tris-2,3-dibromopropylphosphate.

In addition to the aforementioned halogen substituted phosphates, inorganic flame retardants such as aluminum oxide hydrate, antimony trioxide, arsenic oxide, ammonium polyphosphate and calcium sulfate as well as esterification products of low molecular polyols and halogenated phthalic acid derivatives may be used for rendering the PUR flexible foams flame resistant. Generally it has proven to be advantageous to use 5 to 50 parts by weight, preferably 5 to 25 parts by weight, of the mentioned flame retardants per 100 parts by weight of polyol used.

Additional details on the above-mentioned other commonly used auxiliaries and additives may be found in the literature, for instance, the monograph by J. H. Saunders and K. C. Frisch, "High Polymers Series—vol. XVI," *Polyurethanes,* parts 1 and 2, Interscience Publishers, 1962 and 1964.

For the preparation of PUR flexible foams according to the process of this invention, the organic polyisocyanates and polyoxyethylene-capped polyols and, optionally, other polyether polyols, chain extenders and cross-linking agents are reacted in the presence of catalysts, blowing agents and, optionally, auxiliaries and additives at temperatures of 0° C. to 70° C., preferably 15° C. to 50° C. in such quantity ratios that 0.5 to 2, preferably 0.8 to 1.6, and particularly approximately one reactive hydrogen atom(s) bonded to the polyoxyethylene-capped polyol, water, optionally other polyether polyol and chain extenders or cross-linking agents are present per isocyanato group.

The flexible PUR foams are produced in accordance with the prepolymer and preferably the one-shot method. According to the one-shot method, the starting components, auxiliaries and additives are individually introduced when using a mixing chamber with several feed nozzles and are intensively mixed in the mixing chamber. However, it has proven to be particularly advantageous to work in accordance with the two-component method and to combine the polyoxyethylene-capped polyols, catalysts, blowing agents and optionally other polyether polyols, chain extenders or cross-linking agents, auxiliaries and additives to component A and to use the organic modified or unmodified polyisocyanates optionally mixed with physical blowing agents, auxiliaries and additives as component B. This method is used on a preferred basis. The advantage of this method is that A and B components can be transported in a space-saving manner and can be stored for a limited amount of time and only require intensive mixing prior to preparation of the flexible PUR foam.

The flexible PUR foams produced in accordance with this invention has densities of 7 to 120 kg/cubic meter, preferably 25 to 60 kg/cubic meter, and excel by increased breaking elongation with very good mechanical properties.

The highly elastic flexible PUR foams are suited for the production of upholstered furniture, mattresses, automobile seats and headrests as well as particularly for molded foams.

The parts referred to in the examples are parts by weight.

Preparation of the polyoxyethylene-capped polyols 1 to 4 to be used in accordance with this invention and the comparison substances A and B.

GENERAL PROCEDURE FOR PREPARATION OF POLYOLS

The hydroxyl group terminated polyalkylene polyethers were produced in accordance with a three- or four-stage process. Depending upon the technical conditions, however, the oxyalkylation may be subdivided into further reaction steps. After complete reaction of the alkylene oxides used to make the base polyether polyol, the catalyst concentration was increased in one step with varying amounts of catalyst and further reaction with ethylene oxide was carried out.

First Stage

The initiator molecule was placed in the reactor and mixed with a 45 percent by weight aqueous potassium hydroxide solution. To form the alcoholate, the mixture was heated to 130° C. under reduced pressure while removing water by distillation for a period of 1.5 hours.

Second Stage

The propylene oxide, optionally containing ethylene oxide, was added at such a rate at a temperature of 105° C. that a maximum pressure of 7 bars was not exceeded. After completing the addition of alkylene oxide and a subsequent reaction period of 4 to 5 hours, the reaction mixture was stripped in order to separate the residual monomer.

Third Stage

The reaction mixture was mixed with additional catalyst and was heated to 120° C. under reduced pressure in order to separate the reaction water produced by the alcoholate formation. This process was continued until no additional water was removed.

Fourth Stage

Analogous with the second stage, ethylene oxide was added at 105° C. and under a maximum pressure of 5 bars. After the ethylene oxide reaction was completed, the reaction mixture was stripped under reduced pressure in order to remove the residual monomer and was processed according to known methods. The starting components used and their quantities as well as the characteristic data of the resultant polyoxyethylene-capped polyols were combined in Table I.

TABLE I

| Reaction Charges, Conditions, and Results | | | Polyoxyethylene-capped Polyol Examples | | | | Comparison Examples | |
|---|---|---|---|---|---|---|---|---|
| | | | 1 | 2 | 3 | 4 | A | B |
| First Stage | Initiator: Glycerin | (g) | 92.09 | 103.29 | 103.29 | 92.09 | 72.3 | 92.09 |
| | 45% by weight aqueous KOH | (g) | 37.40 | 26.67 | 26.67 | 13.4 | 16.1 | 13.4 |
| KOH/reactive H—atoms | | (mole) | 0.1 | 0.063 | 0.063 | 0.036 | 0.054 | 0.036 |
| Second Stage | Propylene oxide | (g) | 4079 | 5483 | 5307 | 2384 | 3483.9 | 2596 and 136 grams ethylene oxide |
| | Maximum pressure | (bar) | 5.8 | 6.8 | 6.7 | 6.7 | 6.8 | 5.5 |
| | Hydroxyl number | | 37.0 | 38.0 | 38.5 | 68 | 40.2 | 68 |
| Third Stage | 45% by weight aqueous KOH | (g) | — | 393.5 | 392.7 | 74.8 | — | — |
| KOH/reactive H—atoms | | (mole) | — | 0.937 | 0.93 | 0.2 | — | — |
| Fourth Stage | Ethylene oxide | (g) | 636.7 | 392.7 | 589.6 | 523 | 567 | 174 |
| Oxyethylation degree* | | | 4.82 | 2.65 | 4.0 | 4.0 | 5.47 | 1.32 |
| | Maximum pressure | (bar) | 4.5 | 3.5 | 3.6 | 3.5 | 4.7 | 4.5 |
| Polyoxyethylene-capped polyol: | | | | | | | | |
| | Hydroxyl number | | 35.2 | 36 | 35 | 56.8 | 34.8 | 56 |
| | Primary hydroxyl groups | (%) | 85 | 75 | 85 | 80 | 75 | 45 |
| | Unsaturation | (% by wt.) | 0.06 | 0.052 | 0.06 | 0.013 | 0.058 | 0.02 |
| | Acid number | | 0.01 | 0.05 | 0.05 | 0.01 | 0.01 | 0.01 |
| | Water content | (% by wt.) | 0.03 | 0.10 | 0.10 | 0.05 | 0.04 | 0.01 |

*taking into consideration the unsaturated portions

PREPARATIONS OF POLYURETHANE FLEXIBLE FOAMS

Example 5

A mixture of 100 parts by weight of polyether polyol according to Example 1, 2.8 parts by weight of water, 1.0 part by weight of diazabicyclooctane (33 percent by weight in dipropylene glycol), and 0.5 part by weight of a foam stabilizer based on silicon (Tegostab ® B4690 by Goldschmidt, Essen) were intensively mixed with 35.2 parts by weight of a mixture consisting of 80 parts by weight of 2,4- and 2,6-toluene diisocyanate (weight ratio 80:20) and 20 parts by weight of a mixture of diphenylmethane diisocyanates and polyphenyl polymethylene polyisocyanates (crude MDI) and the resultant foamable mixture was allowed to foam in an open mold. The measured setting time of the foam was 45 seconds.

Example 6 and Comparison Examples C and D

Example 5 was repeated except that equivalent amounts of the polyether polyols indicated in Table II were used instead of the product of Example 1.

TABLE II

| | Polyether Polyol | Setting Time (seconds) |
|---|---|---|
| Example 6 | in accordance with Example 4 | 70 |
| Comparison Example C | as described under Comparison Example A | 90 |
| Comparison Example D | as described under Comparison Example B | 120 |

Examples 5 and 6 and Comparison Examples C and D show that the flexible polyurethane foams prepared in accordance with the process of this invention have a markedly shorter setting time.

Examples 7 and 8 and Comparison Example E

Example 5 was repeated with the exception that equivalent amounts of polyether polyols described in Table III were used in place of the product of Example 1.

For the preparation of molded foams having a density of 50 grams per liter, 800 grams of the foamable reaction mixture were filled into a mold having dimensions of 40 cm × 40 cm × 10 cm. The mold was closed, and the reaction mixture was allowed to foam.

The following mechanical properties were measured on the resultant flexible polyurethane foams.

TABLE III

| | Comparison Example | Examples | |
|---|---|---|---|
| | E | 7 | 8 |
| Polyether polyol | | | |
| according to Example | — | 2 | 3 |
| according to Comparison Example | A | — | — |
| Elongation (%) | 136 | 153 | 157 |
| Hardness number with 40% compression (N) | 220 | 215 | 220 |
| Compression set[1] (%) | 4.7 | 3.9 | 3.6 |
| Tensile strength[2] (k.Pa) | 95 | 98 | 102 |
| Graves tear strength[3] (N/mm) | 0.48 | 0.51 | 0.53 |
| Open celledness | increasing → | | |
| Setting time (min.) | 1.5 | 1.5 | 1.5 |

[1] DIN 53 572
[2] DIN 53 571
[3] DIN 53 515

The flexible polyurethane foams produced according to the method of this invention in the examples using polyether polyols of comparable reactivity but with a lower content of polymerized ethylene oxide units showed improved elasticity and open celledness.

The embodiments of the invention in which an exclusive privilege or property is claimed are defined as follows:

1. In the process for the manufacture of elastic flexible polyurethane foams by reacting organic polyisocyanates with polyoxyalkylene polyols in the presence of catalysts, blowing agents, and, optionally, compounds serving as chain extenders or cross-linkers, fillers, plasticizers, flame retardant, cell openers, mold release agents, colorants, and the like, the improvement wherein the polyoxyalkylene polyol used has terminal oxyethylene blocks equivalent to an oxyethylene degree of 1 to 13 and at least a minimum primary hydroxyl group content expressed as a percentage of total hydroxyl groups, which increases with the degree of oxyethylation as shown in curve A of the FIGURE.

2. The process of claim 1 wherein the polyoxyethylene-capped polyether polyols have functionalities of 2 to 4 and hydroxyl numbers of 10 to 250.

3. The process of claim 1 wherein the polyoxyethylene-capped polyether polyols have oxyethylation degrees of 2 to 8.

4. The process of claim 1 wherein the polyoxyethylene-capped polyether polyols are used as mixtures with commonly used polyether polyols.

5. The process of claim 4 wherein the mixture of polyols contains 40 to approximately 100 percent by weight of Polyoxyethylene-capped polyether polyols.

6. The process of claim 4 wherein the commonly used polyether polyols are graft polymer-polyether polyols or fillerpolyether polyol dispersions.

7. The process of claim 1 wherein water in an amount of 0.5 to 20 parts by weight per 100 parts by weight of the polyols is used as blowing agent.

8. A flexible polyurethane foam prepared in accordance with claims 1, 2, 3, 4, 5, 6, or 7.

* * * * *